United States Patent [19]

Frank et al.

[11] Patent Number: 4,476,003

[45] Date of Patent: Oct. 9, 1984

[54] CHEMICAL ANCHORING OF ORGANIC CONDUCTING POLYMERS TO SEMICONDUCTING SURFACES

[75] Inventors: Arthur J. Frank, Lakewood; Kenji Honda, Wheatridge, both of Colo.

[73] Assignee: The United States of America as represented by the United States Department of Energy, Washington, D.C.

[21] Appl. No.: 483,040

[22] Filed: Apr. 7, 1983

[51] Int. Cl.$^3$ .............................................. C25B 11/00
[52] U.S. Cl. ................................. 204/290 R; 429/111; 427/82
[58] Field of Search ..................... 204/290 R; 429/111; 427/82

[56] References Cited

U.S. PATENT DOCUMENTS 4,379,740  4/1983  Nazzal ................................ 429/111

OTHER PUBLICATIONS

Yoneyama et al., J. Electroanal. Chem. 108 (1980), 87-95.
Simon et al., J. Am. Chem. Soc. 1982, 104, 2031-2034.
Bookbinder et al., Proc. Natl. Acad. Sci., vol. 77, No. 11, pp. 6280-6284, Nov. 1980.
Fox et al., J. Am. Chem. Soc., 102:12, 4036-4039, Jun. 1980.
Noufi et al., J. Am. Chem. Soc. 1981, 103, 1849-1850.

*Primary Examiner*—John F. Niebling
*Attorney, Agent, or Firm*—Kenneth L. Richardson; James W. Weinberger; Michael F. Esposito

[57] ABSTRACT

According to the present invention, an improved method of coating electrodes with conductive polymer films and/or preselected catalysts is provided. The charge-conductive polymer is covalently or coordinatively attached to the electrode surface to strengthen the adhesion characteristics of the polymer to the electrode surface or to improve charge-conductive properties between the conductive polymer and the electrode surface. Covalent or coordinative attachment is achieved by a number of alternative methods including covalently or coordinatively attaching the desired monomer to the electrode by means of a suitable coupling reagent and, thereafter, electrochemically polymerizing the monomer in situ.

25 Claims, No Drawings

CHEMICAL ANCHORING OF ORGANIC CONDUCTING POLYMERS TO SEMICONDUCTING SURFACES

CONTRACTUAL ORIGIN OF THE INVENTION

The United States Government has rights in this invention pursuant to Contract No. EG-77-C-01-4042 between the U.S. Department of Energy and the Midwest Research Institute.

BACKGROUND OF THE INVENTION

1. Field of the Invention

This invention relates to the field of electrochemistry and to photoelectrochemical cells having electrodes coated with protective and/or catalytic coatings which enhance the efficiency of the photoelectrochemical devices. More specifically, the present invention relates to an improved method of attaching such protective and/or catalytic coatings onto semiconductor electrodes including particulate semiconductor microelectrode systems.

2. Description of the Prior Art

The field of photoelectrochemistry is recognized as having the potential to enable solar energy utilization to meet many of the energy needs of the future. Through the action of light, photoelectrochemical cells can be used to generate electric power and/or to synthesize fuels and desired chemicals from abundant, renewable resources such as water, nitrogen and carbon dioxide.

Photoelectrochemical cells can be configured such that one or both electrodes are photoactive semiconductors. The electrodes are in contact with an electrolyte which may be in liquid form or may also comprise a solid polymer matrix. A junction is formed at the semiconductor-electrolyte interface in the dark as the two phases come into electronic equilibrium such that the Fermi level of the semiconductor $E_F$ equals the electrochemical potential of the solution, $E_{redox}$, producing a barrier height which depends on the nature of the solution species and the specific semiconductor. On illumination of the semiconductor with light energy equal to or greater than that of the semiconductor bandgap, electrons are promoted from the valence band to the conduction band, creating electron-hole pairs at or near the interface. The electron-hole pairs are spatially separated by the semiconductor junction barrier and are injected into the electrolyte at the respective electrodes to produce electrochemical oxidation and reduction reactions.

A major impediment to the exploitation of photoelectrochemical cells in solar energy conversion and storage is the susceptibility of small bandgap semiconductor materials to photoanodic and photocathodic degradation. The photoinstability is particularly severe for n-type semiconductors where the photogenerated holes which reach the interface can oxidize the semiconductor itself. In fact, all known semiconducting materials are predicted to exhibit thermodynamic instability toward anodic photodegradation. Whether or not an electrode is photostable then depends on the competitive rates of the thermodynamically possible reactions, namely, the semiconductor decomposition reaction and the electrolyte reactions.

Examples of photoanodic decomposition reactions are compiled in Table I.

TABLE 1

Examples of Photoanodic Decomposition Reactions of Various Semiconductor Electrodes

| Semiconductor | Decomposition Photoanodic Process |
|---|---|
| Si | $Si + 4h^+ + 2H_2O \rightarrow SiO_2 + 4H^+$ |
| GaAs | $GaAs + 6h^+ + 5H_2O \rightarrow Ga(OH)_3 + HAsO_2 + 6H^+$ |
| GaP | $GaP + 6h^+ + 6H_2O \rightarrow Ga(OH)_3 + H_3PO_3 + 6H^+$ |
| CdS | $CdS + 2h^+ \rightarrow Cd^{2+} + S$ |
| CdSe | $CdSe + 2h^+ \rightarrow Cd^{2+} + Se$ |
| MoS$_2$ | $MoS_2 + 18h^+ + 12H_2O \rightarrow MoO_3^{2-} + 2SO_4^{2-} + 24H^+$ |
| WO$_3$ | $WO_3 + 2h^+ + 2H_2O \rightarrow WO_4^{2-} + \frac{1}{2}O_2 + 4H^+$ |

The range of approaches for suppression of the photocorrosion problem in cells for chemical production is more severe than that for electricity-generating cells. This is particularly true if the electrolyte contains water. Table II illustrates some examples of fuel-producing reactions in aqueous electrolytes.

TABLE 2

Some endergonic fuel generation reactions starting with N$_2$, CO$_2$ and H$_2$O

| Reaction | H° (kJ mol$^{-1}$)$^a$ | G° (kJ mol$^{-1}$)$^a$ |
|---|---|---|
| $H_2O(L) \rightarrow H_2(g) + \frac{1}{2}O_2(g)$ | 286 | 237 |
| $CO_2(g) + H_2O(L) \rightarrow HCOOH(L) + \frac{1}{2}O_2(g)$ | 270 | 286 |
| $CO_2(g) + H_2O(L) \rightarrow HCHO(g) + O_2(g)$ | 563 | 522 |
| $CO_2(g) + 2H_2O(L) \rightarrow CH_3OH(L) + \frac{3}{2}O_2(g)$ | 727 | 703 |
| $CO_2(g) + 2H_2O(L) \rightarrow CH_4(g) + 2O_2(g)$ | 890 | 818 |
| $N_2(g) + 3H_2O(L) \rightarrow 2NH_3(g) + \frac{3}{2}O_2(g)$ | 765 | 678 |

TABLE 2-continued

| Some endergonic fuel generation reactions starting with $N_2$, $CO_2$ and $H_2O$ | | |
|---|---|---|
| Reaction | H° (kJ mol$^{-1}$)$^a$ | G° (kJ mol$^{-1}$)$^a$ |
| $CO_2(g) + H_2O(L) \longrightarrow \frac{1}{6} C_6H_{12}O_6(s) + O_2(g)$ | 467 | 480 |

1 V = 23.06 K cal/mol — 96.485 kJ/mol
1 J = 0.23901 cal

Water is a particularly attractive source of hydrogen for the reduction of materials such as $N_2$ and $CO_2$ as well as for the direct generation of $H_2$. Water can only be used, however, if the semiconductor electrodes are stable in its presence. In the illustrations, the production of energy rich materials (e.g. $H_2$, $CH_3OH$, $CH_2O_3$, $CH_2O_2$ and $NH_3$) is associated with $O_2$ evolution. A major problem in photoelectrochemistry is that the oxidation of water at the photoanode of nonoxide n-type materials is thermodynamically and kinetically disfavored over the reaction of the valence band holes with the semiconductor lattice. In fact, all known nonoxide and many oxide n-type photoanodes are susceptible to photodegradation in aqueous electrolytes.

Approaches have been used to control the photoinstability of the semiconductor-electrolyte interface by coating the semiconductor surface. For example, to stabilize semiconductor surfaces from photodecomposition, noncorroding layers of metals or relatively stable semiconductor films have been deposited onto the electrode surface. It has been reported that continuous metal films which block solvent penetration can protect n-type GaP electrodes from photocorrosion. However, if the films are too thick for the photogenerated holes to penetrate without being scattered, they assume the Fermi energy of the metal. Then the system is equivalent to a metal electrolysis electrode in series with a metal-semiconductor Schottky barrier. In such a system, the processes at the metal-semiconductor junction control the photovoltage and not the electrolytic reactions. In general, a bias is required to drive the water oxidation. In other cases, the metal can form an ohmic contact that may lead to the loss of the photoactivity of the semiconductor. In discontinuous metal coatings, the electrolyte contacts the semiconductor, a situation which can lead to photocorrosion. For example, discontinuous gole films do not seem to protect n-type GaP from photocorrosion.

Corrosion-resistant wide-bandgap oxide semiconductor ($TiO_2$ and titanates mostly) coatings over narrow bandgap n-type semiconductors such as GaAs, Si, CdS, GaP, and InP have been shown to impart protection from photo-decomposition. One of two problems is currently associated with the use of optically transparent, wide-bandgap semiconducting oxide coatings: either a thick film blocks charge transmission or a thin film still allows photocorrosion.

Wrighton et al. (1978) have shown that chemical bonding of an electroactive group to an n-type semiconductor surface can reduce oxidative photocorrosion of the electrode during electrical power generation. However, the electroactive group consisted of ferrocene molecules which are not polymeric. When a polymeric material containing a catalyst was covalently attached to the electrode surface, the polymer was not electrically conductive and the electrode was p-type [Dominey et al. J. Am. Chem. Soc. 104, 467 (1982)]. This distinction is important because with p-type electrodes, photodegradation by reductive processes is not a major problem in photoelectrochemical solar energy utilization. In the case of n-type and p-type semiconductors coated directly with thin catalytically active metal films for gaseous fuel production, and generally poor adherence of the metal to the semiconductor surface is a major impediment.

Charge conduction is generally much higher in electrically conductive polymers than in typical electroactive polymers. Accordingly, work on charge-conductive polymers in the field of photoelectrochemistry has been directed toward stabilization of electrodes against photodegradation in electricity generating cells. Charge-conductive polymers are known to protect certain semiconductor surfaces from photodecomposition by transmitting photogenerated holes in the semiconductor to oxidizable species in the electrolyte at a rate much higher than the thermodynamically favored rate of decomposition of the electrode. For example, R. Noufi, A. J. Frank, A. J. Nozik [J. Am. Chem. Soc., 103, 1849 (1981)] demonstrated that coating n-type silicon semiconductor photoelectrodes with a charge-conductive polymer, such as polypyrrole, enhances stability against surface oxidation in electricity generating cells. As also reported by R. Noufi, D. Tench and, L. F. Warren, [J. Electrochem. Soc. 127, 2310 (1980)], n-type GaAs has also been coated with polypyrrole to reduce photodecomposition in electricity-producing cells, although the polymer exhibited poor adhesion in aqueous electrolyte.

Preferred methods to deposit the polymer on the electrode surface include in situ synthesis or polymerization of the coating by submersing the electrodes in monomer solution and initiating a current flow through the circuit. Where the electrodes are photoelectrodes light may be required to induce such a current.

The nature and the strength of the interaction between the semiconductor and the surface coating effect the adhesion and the efficiency of charge transfer at the interface and thus the stability of the semiconductor. Polypyrrole films exhibit substantially stronger adhesion to polycrystalline Si than to single-crystal Si because of various physical and chemical factors associated with the surface of the substrates. [A. J. Frank in "Molecular Crystals and Liquid Crystals" (A. J. Epstein and E. M. Conwell, eds.), Vol. 83, Gordon & Breach Science Publishers, New York, 1982. p. 1373] Platinum [T. Skotheim, I. Lundstrom and J. Prejza, J. Electrochem. Soc. 128, 1625 (1981)] and gold [F. F.-R. Fan, B. L. Wheeler, A. J. Bard and R. Noufi, J Electrochem Soc. 128, 2042 (1981)] metallization of single-crystal Si prior to anodic polymerization of pyrrole increases the adhesion of the film during power generation. However, during the synthesis of gaseous fuels, such surface deposits of noble metals underlying polymer films can serve as catalytic sites for gas generation which can physically disrupt the polymer-substrate interaction and thus lead to the detachment of the film. Moreover, the use of a metal underlayer to improve the adhesion of the polymer to the substrate has been limited to Si where the adhesion of the metal to the Si is favorable; the general application of the method to other types of semiconductors may not be possible. Another possible limitation of the method is that the high density of electronic states of metal films can adversely affect the interface energetics of the semiconductor and the electrolyte by leading to Fermi-level pinning and thus deleteriously affect the fuel generating reaction.

Despite the promising use of polypyrrole on n-type silicon to suppress photodecomposition, heretofore, the ability to adequately adhere conductive polymers alone or as used in conjunction with catalysts has been uncertain.

SUMMARY OF THE INVENTION

According to the present invention, an improved method of coating electrodes with conductive polymer films and/or preselected catalysts is provided. The charge-conductive polymer is covalently or coordinatively attached to the electrode surface to strengthen the adhesion characteristics of the polymer to the electrode surface or to improve charge-conductive properties between the conductive polymer and the electrode surface. Covalent or coordinative attachment is achieved by a number of alternative methods including covalently or coordinatively attaching the desired monomer to the electrode by means of a suitable coupling reagent and, thereafter, electrochemically polymerizing the monomer in situ.

DETAILED DESCRIPTION OF THE PREFERRED EMBODIMENTS

According to the present invention, an improved method of coating electrodes is provided wherein polymers such as charge-conductive organic polymer films are chemically anchored or attached to the surface of a semiconductor electrode. A suitable coupling reagent capable of reacting with the desired polymer(s) or monomer of the desired polymer(s) and with the semiconductor is used.

The polymer typically may have at least one catalyst and/or charge-relaying reagent on its surface and/or incorporated therein. Such coated electrodes are particularly well suited for use in photoelectrochemical cells; e.g., for generation of electricity, fuel or useful chemicals. The conductive polymer not only provides a means for securing a catalyst and/or charge relay for generation of electricity or the particular fuel or chemical, but the polymer film also can provide a barrier to direct photodegradation or chemical degradation of the electrode. The coupling reagent serves as an anchor for the polymer and itself may aid in conducting charges and/or protecting against oxidation of the semiconductor.

According to the present invention, the electrode or photoelectrode can be modified or coated by chemical anchoring of the coupling reagent followed by the covalent or coordinative attachment of the monomer or the polymer to the surface of the electrode or alternatively, the coupling reagent can be chemically attached to the monomer or to the polymer which in turn is covalently or coordinatively bonded to the surface of the electrode. Once the monomer is chemically anchored to the surface, electrochemical synthesis or photoelectrosynthesis can be carried out to fabricate the polymer.

By coupling reagent or chemical anchor is meant a molecule which has more than one reactive site or functional group to permit the coupling of a desired charge conductive polymer with the semiconducting substrate. Typical functional groups include but are not limited to carboxyl, acid anhydride, isocyanate, epoxy, aldehyde, and silylalkoxy groups. Also included in the definition of coupling reagent are molecules with chemical groups or ligands which can coordinate to metal atoms or ions of the electrode surface lattice. Examples of such molecules include but are not limited to pyridine, imidazole, carboxylic acid, and amines. The particular synthetic route to couple a polymer to the electrode surface will, in general, depend on whether or not the surface of the electrode is covered by a relatively stable oxide layer. The coupling or anchoring reagent may have different functional sites for coordinative and/or covalent bonding.

By charge conductive polymer is meant polymers with an extended pi-bonded system. These include polymers which by virtue of their chemical structure have a backbone which permits charge conduction. Polymers of this type include polyacetylene-type polymers and poly(p-phenylene) type polymers, [i.e., derivatives of poly(p-phenylene) or poly(p-phenylene) sulfide] and the heterocyclic aromatic polymers with extended pi-bonding, [e.g., polypyrrole, poly(3,4-dimethylpyrrole), poly(3-methythiophene)]. Also included are the phthalocyaninatometal polymers in which the central metal is a transition metal (e.g., $Fe^{2+}$, $Co^{2+}$, and $Co^{3+}$) and the organic bridging ligands contain delocalized pi-electrons (e.g., pyrazine, 4,4'-bipyridine, and 1,4-diisocyanobenzene). Also included are the bridged-stacked phthalocyanines or metallophthalocyanines where piorbital overlap occurs at the phthalocyanine rings. Also included are charge conductive polymers derived from the addition of metals or graphite particles to organic polymers. All of these conductive polymers work synergistically with catalyst and/or charge-relaying agents. By charge-relaying agents is meant redox species associated with the polymer that serve to transmit the photogenerated charges to the final desired charge-transfer reactions. For purposes of describing the present invention the term "redox enhancer" is interchangeably used to generically describe catalysts and/or charge-relaying agents useful in the practice thereof.

In the photoelectrochemical cells wherein electrodes are coated by the method of the present invention, the n-p junction known in solid-state photovoltaic devices is generally replaced with an n-electrolyte-p (or metal) junction. Electron-hole pairs are generated by the absorption of light in either or both semiconductor electrodes. The electron-hole pairs are separated by the semiconductor-electrolyte junction barrier and are injected at the respective electrodes to produce electrochemical oxidation and reduction reactions. While the present description is in terms of a single bandgap n-type and/or bandgap p-type material, as is known by those skilled in the art, the n-type electrode may consist of multiple layers of or combination of more than one bandgap n-type material and the p-type electrode may consist of multiple layers of or combination of more than one bandgap p-type material. Such multiple layers of or combination of different bandgap materials permit absorption of different wavelengths of light for better utilization of the solar spectrum. The coupling reagent selected must be suitable for the particular semiconductor(s) and the electrolyte. Where the electrode is particulate the electron-hole pairs may be separated at the elelctrolyte interface and/or at the internal junctions in instances where the particle comprises more than one type of semiconductor.

While single-crystal material may be employed, the electrodes of the invention may also be in the form of thin films (about 500 A to 10 $\mu$m in thickness) and may be either polycrystalline, with a crystallite size ranging from about 25 A to 1 mm, or amorphous. Also included with the semiconductors useful in the particles of the present invention are particulate semiconductors raging in size from 2 nm or less, to 300 nm, or larger, 300 nm to 1 mm.

n-Type materials which may be coated by the method of the present invention involve suitably doped semiconductors, multiple layers thereof, or combinations thereof with bandgaps between 0.5 and 3.0 eV including elements (e.g., Si, Se), transition metal oxides (e.g., $Fe_2O_3$, $Fe_2TiO_5$), II-VI Compounds, III-V Compounds, III-VI Compounds, mixed crystals of II-VI Compounds (e.g. $CdSe_xTe_{1-x}$), mixed crystals of III-V Compounds, IV-VI Compounds, I-III-$VI_2$ Compounds (e.g., $CuInSe_2$), II-IV-$V_2$ Compounds (e.g. $ZnSiP_2$), transition metal chalcogenides (e.g. $ZrS_2$, $MoS_2$, $WSe_2$), and various other ternary compounds where the Roman numerals refer to a group or groups of the Periodic Table of Elements.

p-Type materials which may be coated by the method of the present invention involve suitably doped semiconductors, multiple layers thereof, or combinations thereof with bandgaps between 0.5 and 3.0 eV including elements (e.g. Si), transition metal oxides, II-VI Compounds, III-V Compounds, III-VI Compounds, I-III-$VI_2$ Compounds, II-IV-$V_2$ Compounds, transition metal chalcogenides and various other ternary compounds where the Roman numerals refer to a group or groups of the Periodic Table of Elements.

Solvents useful as the media for synthesis of polymers according to this invention should be chemically and/or electrochemically stable towards the coupling reagents or polymers. Such solvents include but are not limited to acetonitrile, tetrahydrofuran, dimethylformamide, benzene, and toluene.

It is possible to select as the conductive polymer one which can function to provide a barrier to photodecomposition of the electrode by preventing direct contact with the electrolyte. In such instances, the electrode communicates with the electrolyte via the electronic properties of the charge conductive film and a coupling reagent must be selected which does not electronically insulate the polymer from the semiconductor.

Conductive polymers which may be coated according to the practice of the present invention permit manipulation of the interfacial chargetransfer kinetics in a manner which suppresses photodecomposition and which promotes desirable redox reactions. In addition, conductive polymers useful in the practice of the present invention may be polymers having good electronic transport properties at high solar intensities (e.g., about 80 to about 140 mW/cm$^2$). The conductive polymers can act to channel a high density of photogenerated minority carriers from the semiconductor to desirable redox species in the electrolyte at a rate greatly exceeding the rate of photodecomposition of the semiconductor. The polymers also are characterized by a large surface area whereby they can provide a driving force for rapid charge transport from the semiconductor.

While not intending to be bound by this theory, it is believed that the specific interface energetics will depend on whether or not the redox electrolyte can penetrate the polymer film to the semiconductor, and more specifically it will depend on the activity of the water at the polymer-semiconductor interface. If the polymer film is permeable to the electrolyte as in the case of polypyrrole films in water containing simple anions (e.g. $ClO_4^-$, $SO_4^{2-}$), rectification can be determined principally by the semiconductor-electrolyte junction. For this situation, protection of the semiconductor surface will hinge considerably on the good electronic transport properties of the polymer compared with the photodecomposition rate. Alternatively, a hydrophobic polymer may be desirable if it does not severely affect the desired redox kinetics. Hydrophobicity will reduce solvation effects and thus shift the decomposition potential of the electrode to positive values; however, it can also affect adversely the thermodynamics and kinetics of the desired redox processes. The coupling reagent must strongly append the polymer to the surface of the semiconductor.

The coupling linkage should have a delocalized electron system to permit good electronic communication between the charge conductive polymer and the semiconducting substrate. Alternatively, if the electron system is not delocalized, the chain length of the coupling linkage must be sufficiently short to permit good charge transport between the conductive polymer and the substrate. Furthermore, the chain length of the coupling linkage must permit proper orientation of the conductive polymer units for good charge transport along the polymeric structure.

To protect the semiconductor against photocorrosion, the polymer and coupling linkage must be kinetically inert and/or more electrochemically stable than both the semiconductor and the redox electrolyte. Inertness depends on the composition of the redox electrolyte (solvent, redox species, counterions, etc.). The redox electrolyte must efficiently scavenge the transmitted minority carriers from the polymers or from a redox enhancer associated with the polymer, incorporated within or on the surface of the polymer, if chemical corrosion of the polymer itself is to be avoided. Disruption of the electronic unsaturation of the polymer and coupling linkage through chemical reactions with the solvent or redox species may produce deterioration of the electrical conductivity of the surface coating and a diminished effectiveness in the stabilization of the semiconductor.

The protective polymer must conduct to the redox electrolyte minority species; i.e., either holes for n-type semiconductors or electrons for p-type materials or alternatively may transmit both holes and electrons.

The extinction coefficient of the surface coating useful in the practice of the present invention for protection of the semiconductor against corrosion is preferably small over the spectral region where the semiconductor absorbs so as not to attenuate the excitation energy of the semiconductor.

The redox enhancers; i.e., the catalysts and/or charge-relaying agents, which may be used in conjunction with the polymers may be any of those known in the art. Examples of such redox enhancers are prophyrins, phthalocyanines, macrocyclic metallic complexes, organic dyes, coordination complexes, inorganics and organometallics. The redox enhancer may also be present as particles (2 nm or less to about 300 nm in size) or larger (300 nm to 1 mm) in size. Representative materials for particles are transition metals such as platinum, palladium, rhodium, rhenium, ruthenium and, iridium, and the oxides thereof, silicas and zeolite. The same metals may also be present in various combinations or in supports (e.g., zeolites). The materials may also include semiconductors which may themselves be light-activated.

In selecting a particular redox enhancer consideration is given to its immobilization onto the electrode surface. The redox enhancer must be chemically or physically attached to the conductive polymers and not detached. As will be known and understood by those skilled in the art, electron-accepting or electron-donating reagents; i.e., charge-relaying reagents, may be used instead of or in conjunction with catalysts. Typical of such charge-relaying agents are viologen derivatives. The catalysts and/or other charge-relaying reagents may be on the surface of the conductive polymer and/or in the interior of the film. In operation, the catalyst associated with the conductive film accepts charges; i.e., electrons or holes, from the electrode and/or from an electron acceptor or an electron donor in the vicinity of the catalyst in the condensed phase. The polymer conducts charges between the inorganic semiconductor electrode and the catalyst and/or charge-relaying agent.

According to the present invention the monomer or oligomer of a desired conductive polymer can be chemically attached to the electrode surface and then electrochemically polymerized with the monomer or oligomer of the same polymer. Alternatively, the monomer or oligomer of a copolymer can be chemically coupled to the electrode surface and then copolymerized with the monomer or oligomer of a different polymer. One of the copolymers does not necessarily need a delocalized pi electron system if it does not impede good charge transport between the semiconductor and the conductive polymer and the conductive polymer and the redox electrolyte. In practice, the electrode surface can be activated with the coupling reagent followed by the attachment of the monomer or oligomer of the desired polymer. Alternatively, the monomer or oligomer can be activated with the coupling reagent prior to attachment to the electrode surface. After chemical attachment of a monomer or oligomer to the electrode surface, electrochemical polymerization with the appropriate monomer is utilized. Alternatively, the conductive polymer can be chemically attached to the electrode surface.

In selecting a particular coupling reagent consideration is given to whether or not the semiconductor surface has a relatively stable oxide layer. If the semiconductor has a relatively stable oxide surface, the hydroxyl functionality of the electrode can be used with an appropriate coupling reagent to append chemically a charge conductive polymer to the electrode surface. For purposes of describing this invention, non-oxide semiconductors refer to those which form no oxides or only relatively unstable oxides in the presence of water.

Coupling reagents which can react with the surface hydroxyl groups may have but are not limited to the following functionalities: carboxyl, acid anhydride, acid chloride, silylalkoxy, isocyanate, epoxy and alkyl halide. Illustrative coupling reagents include but are not limited to diisocyanates, epichlorohydrin, formaldehyde, dialdehydes, dicarboxylic acids and their halides, phthalic anhydride, maleic ahydride and other anhydrides and a variety of organosilanes such as alkylamines, acid chloride and pyridine silanes. The metal oxide surfaces can be coupled variously as esters and ethers and coordinated to metals. In some cases, hydroxyl groups can be activated for coupling reactions with cyanuric chloride.

In the case of the non-oxide, transition metal semiconductors, the surface of the electrode can be activated with coupling reagents that form a coordinative bond to the surface metal atoms. Such coupling reagents may contain both polymerizable and chelating groups. Chelating groups include but are not limited to pyridyl, imidazolyl, amino and carboxyl functionalities. Polymerizable groups include but are not limited to vinyl, pyrrolyl, thiophenyl, phenolyl, and thiophenolyl. Preferred coupling reagents include but are not limited to 4-vinylpyridine, N-vinylimidazole, acrylic acid, p-aminostyrene, and N-(4-pyridyl)-pyrrole.

In a preferred embodiment of the present invention polypyrrole is coated to silicon to protect and stabilize the silicon against insulating oxide formation. Heretofore, polypyrrole has been known to not adhere well to silicon. According to the present invention, polypyrrole is covalently anchored to the surface oxide of Si as, for example, by the following synthetic scheme (1) for coupling:

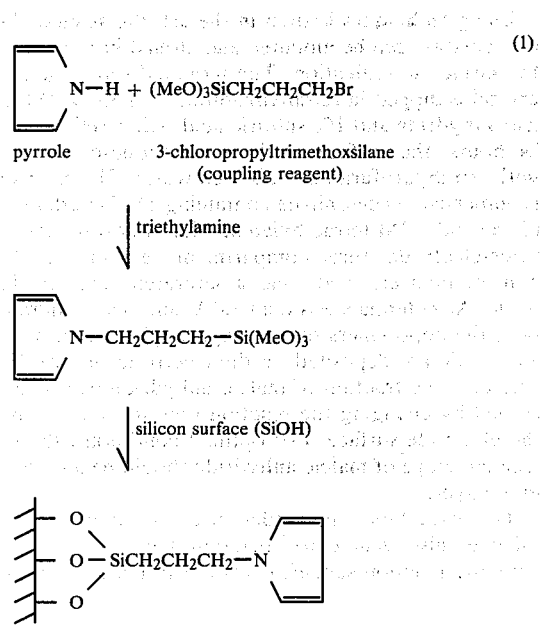

Following this synthesis polypyrrole is formed by electropolymerization or photoelectropolymerization.

N-type Si or in general other oxide-type semiconductors can be coated with a copolymer of 3-methylthiophene and maleic anhydride by the following synthetic scheme (2) for coupling:

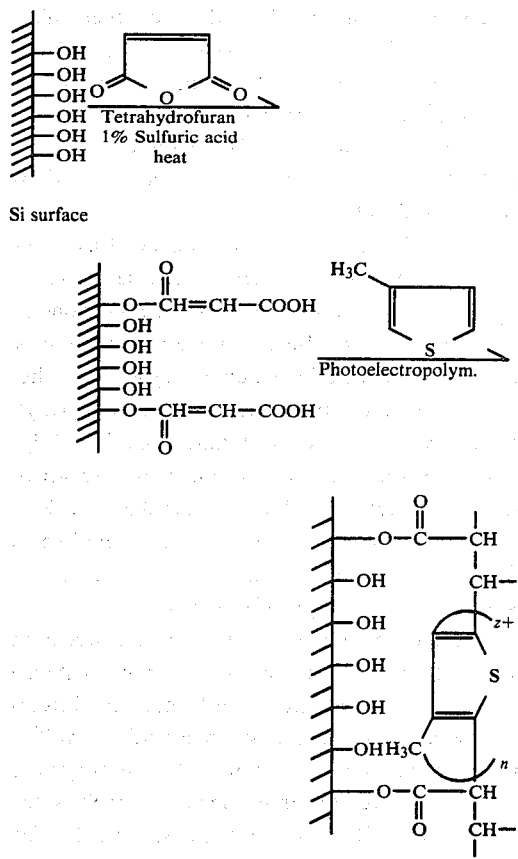

(2)

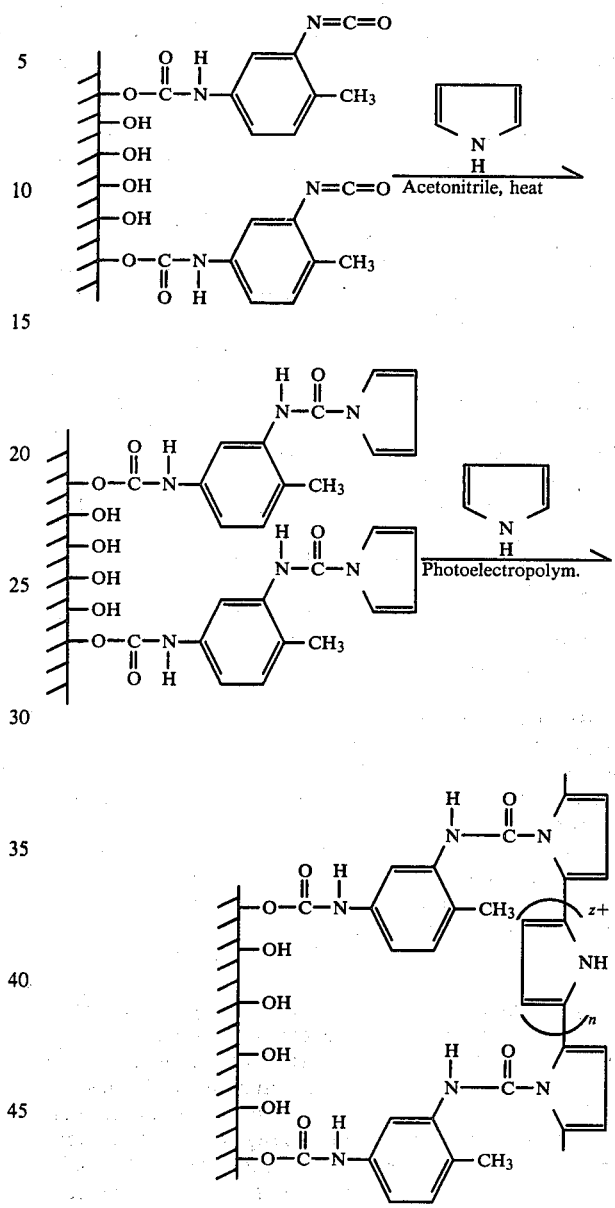

Using techniques known in the art, the semiconductor substrate can be mounted and etched in preparation for surface modification. The mounted semiconductor crystal is dipped in tetrahydrofuran containing 1M maleic anhydride and 1% sulfuric acid. After refluxing for 24 hours, the surface of the semiconductor is rinsed with tetrahydrofuran and distilled water. The electrode is immersed in acetonitrile containing 1M 3-methylthiophene and 0.3M tetraethylammonium fluoroborate in a three-electrode, three-compartment cell with a platinum counter-electrode and a saturated calomel electrode. At potentials less than 3.0 V and under illumination, the copolymers of 3-methylthiophene and maleic anhydride are deposited on the electrode surface. The surface mole fraction of maleic anhydride can be controlled by changing the reaction time for activation of the electrode surface. For optimal conditions, the surface coverage of maleic anhydride should be less than a monolayer.

The oxide-type semiconductor can be activated with toluene diisocyanate for reaction with pyrrole. The coupling reaction scheme (3) is illustrated as follows:

(3)

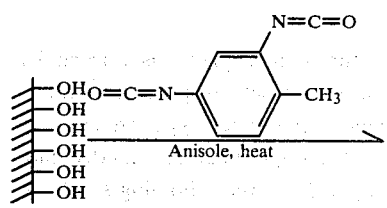

After mounting and etching the semiconductor crystal, the electrode is refluxed overnight in a solvent such as dehydrated anisole containing 0.2M toluene diisocyanate and then rinsed with acetonitrile and distilled water. The electrode is then refluxed overnight in acetonitrile containing 1M pyrrole and then rinsed with acetonitrile. Following the attachment of the monomer, polypyrrole is synthesized photoelectrochemically.

The oxide-type semiconductor can be coated with phthalocyaninatometal polymers which have functional groups (—C≡C, COOH, $NH_2$, ...) on the macrocycle. One synthetic scheme (4) is illustrated below for the case of a carboxylic acid functionality:

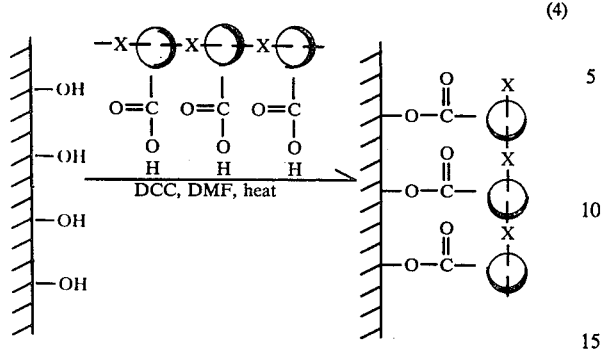

(4)

where ⊙ means phthalocyaninatometal complex and X indicates but is not limited to bipyridine, pyrazine, cyanide, and alkinyl.

After mounting the crystal, the electrode is refluxed for 15 hours in a solvent such as 50 ml dimethylformamide (DMF) containing 50 mg of phthalocyaninemetal polymeric complex and 100 mg of dicyclohexylcarbondiimide (DCC). The electrode is then rinsed with DMF and distilled water.

In a preferred embodiment of the present invention charge-conductive polymers are coated to polar, non-oxide, transition metal semiconductors to stabilize the electrodes again photoinduced dissolution. Heretofore, a charge-conductive polymer has been known not to adhere well to polar, non-oxide, transition metal semiconductors. According to the present invention, the conductive polymer is coordinatively attached to the surface of such semiconductors as, for example, by the following synthetic scheme for coupling polypyrrole to CdS.

N-type Cds or, in general, other non-oxide, transition metal semiconductors can be coated with a copolymer of 4-vinylpyridine and pyrrole by the following scheme (5) for anchoring:

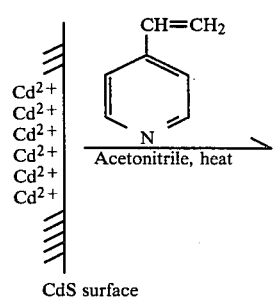

(5)

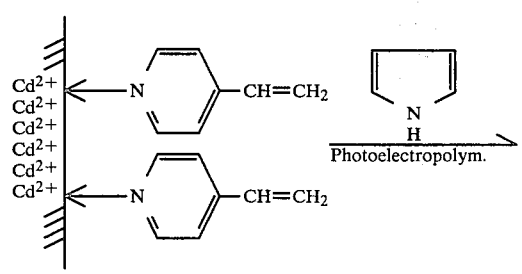

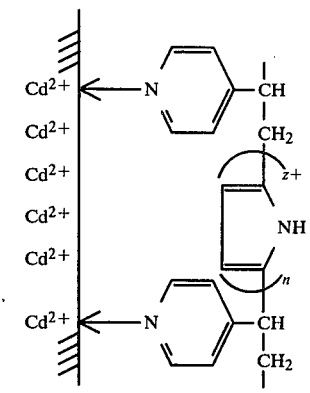

The mounted, etched semiconductor crystal is heated at 50° C. for 24 hours in acetonitrile containing 0.1M 4-vinylpyridine. The electrode is then rinsed with acetonitrile. Following the attachment of 4-vinylpyridine, the copolymer of pyrrole and 4-vinylpyridine is deposited on the electrode surface at an applied potential. The surface mole fraction of 4-vinylpyridine can be controlled by changing the concentration of 4-vinylpyridine in solution. For optimal conditions, the surface coverage of 4-vinylpyridine should be less than a monolayer.

The non-oxide type of semiconductor can also be coated with N-(4-pyridyl)-pyrrole prior to photoelectropolymerization with pyrrole. The anchoring reaction scheme (6) is illustrated for GaP as follows:

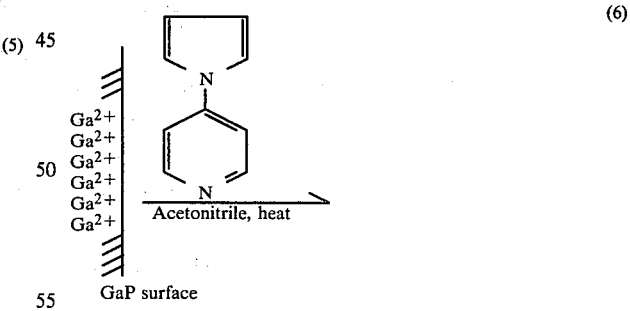

(6)

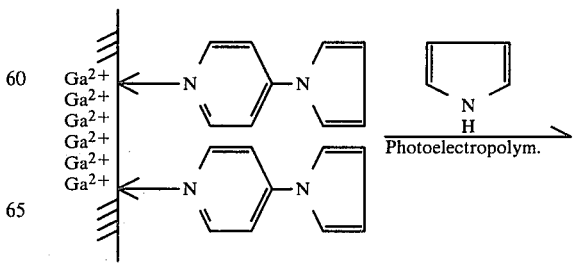

-continued

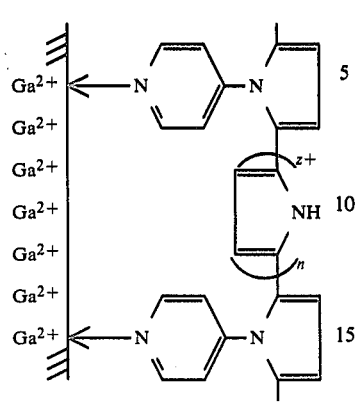

The procedure is similar to that illustrated in scheme (5) except that N-(4-pyridyl)-pyrrole is used as an anchoring comonomer instead of 4-vinylpyridine.

The non-oxide type of transition metal semiconductors can be coordinatively attached to polypyrrole by the photoelectropolymerization of pyrrolyl-metal complex according to the following scheme (7):

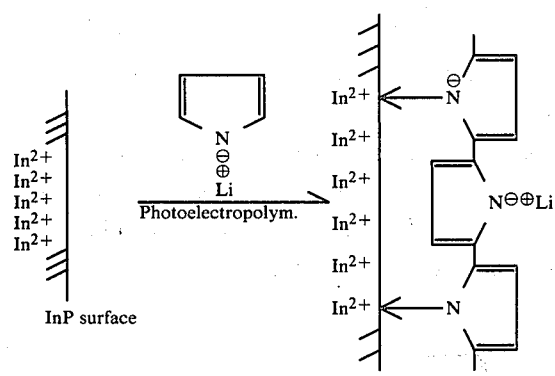

Pyrrole (1M) and lithium hydride (1M) are mixed in acetonitrile and heated at 50° C. under nitrogen for 24 hours. Then 1M of tetraethylammonium fluoroborate is added to the solution, and polypyrrolyl lithium salt is deposited on to the semiconductor surface photoelectrochemically. Lithium cations are partially replaced with $$In^{2+}$$

by metal exchange reaction leading to coordinative bonding between InP and polypyrrole.

The non-oxide type of transition metal semiconductors can also be coordinatively attached to other types of electrically conducting polymers. A synthetic scheme (8) is illustrated below for the attachment of phthalocyaninatometal polymer to CdSe electrodes.

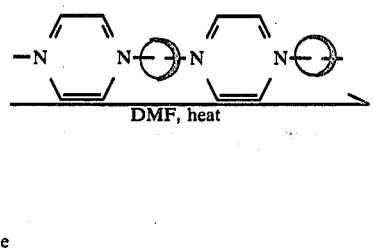

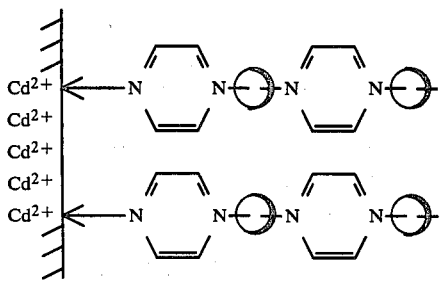

The CdSe electrode is immersed for 2 days in 50 ml DMF at 80°–100° C. containing pyradine-phthalocyaninatometal complex (50 mg) and then rinsed with DMF.

Although the foregoing invention has been described in some detail by way of illustration and example for purposes of clarity and understanding, it will be obvious that certain changes and modifications may be practiced within the scope of the invention, as limited only by the scope of the appended claims.

What is claimed is:

1. A semiconductor electrode with a conductive polymeric coating attached to the surface thereof by means of a coupling reagent for effecting covalent attachment of said conductive polymeric coating to an oxide semiconductor electrode and coordinative attachment of said conductive polymeric coating to a non-oxide semiconductor electrode and for improving adhesion of the conductive polymeric coating to the surface of the semiconductor, wherein attachment of the coupling reagent to the electrode surface is a covalent or a coordinative chemical attachment.

2. A semiconductor electrode according to claim 1 wherein said polymeric coating comprises a homopolymer or a copolymer of at least two monomers.

3. A semiconductor electrode according to claim 1 wherein said polymeric coating further comprises at least one redox enhancer.

4. A method of chemically attaching a conductive polymer to a semiconductor electrode comprising attaching a monomer of said polymer to the surface of said electrode by means of a coupling reagent to effect covalent attachment of the conductive polymer to an oxide semiconductor electrode and coordinative attachment of the conductive polymer to a non-oxide semiconductor electrode, wherein said coupling reagent is attached to the monomer and to the electrode surface, and thereafter polymerizing said monomer.

5. A method according to claim 4 wherein the attachment of the coupling reagent to the electrode surface is covalent.

6. A method according to claim 4 wherein the attachment of the coupling reagent to the electrode surface is coordinative.

7. A method according to claim 4 wherein said coupling reagent is attached to said monomer and thereafter covalently attached to said electrode surface.

8. A method according to claim 4 wherein said coupling reagent is attached to said monomer and thereafter coordinatively attached to said electrode surface.

9. A method according to claim 4 wherein said coupling reagent is covalently attached to said electrode surface and thereafter contacted with said monomer.

10. A method according to claim 4 wherein said coupling reagent is coordinatively attached to said electrode surface and thereafter contacted with said monomer.

11. A method according to claim 4 wherein said semiconductor is non-oxide.

12. A method according to claim 4 wherein said conductive polymer further comprises at least one redox enhancer.

13. A method of attaching a conductive polymer to a semiconductor electrode surface comprising forming the conductive polymer, initialling chemically attaching a coupling reagent to a selected one of said conductive polymer and said electrode surface, and thereafter chemically attaching said coupling reagent to a remaining unattached one of said conductive polymer and said electrode surface, to effect covalent attachment of said conductive polymer to an oxide-semiconductor electrode and coordinative attachment of said conductive polymer to an non-oxide semiconductor electrode.

14. A method according to claim 13 wherein the chemical attachment of said coupling reagent to said surface is covalent.

15. A method according to claim 13 wherein the chemical attachment of said coupling reagent to said surface is coordinative.

16. A method according to claim 14 wherein the coupling reagent is said initially attached to said conductive polymer and thereafter to said electrode surface.

17. A method according to claim 15 wherein the coupling reagent is said initially attached to said conductive polymer and thereafter to said electrode surface.

18. A method according to claim 14 wherein the coupling reagent is said initially attached to said electrode surface and thereafter to said conductive polymer.

19. A method according to claim 15 wherein the coupling reagent is said initially attached to said electrode surface and thereafter to said conductive polymer.

20. A method according to claim 13 wherein the said conductive polymer further comprises at least one redox enhancer.

21. A semiconductor electrode according to claim 1 wherein the coupling reagent is said selected from the coordinative chemical attachments and said semiconductor electrode is non-oxide.

22. A semiconductor electrode according to claim 1 wherein the coupling reagent is said selected from the covalent chemical attachments and said semiconductor electrode is oxide.

23. A method according to claim 4 wherein said semiconductor electrode is oxide.

24. A method of chemically attaching a conductive polymer in conjunction with at least one different polymer to a semiconductor electrode surface comprising forming the conductive polymer, attaching a coupling reagent to a selected one of said electrode surface, said conductive polymer and said at least one different polymer, and thereafter chemically attaching said coupling reagent to a remaining unattached one of said conductive polymer, said at least one different polymer and said electrode surface to effect covalent attachment of said conductive polymer and said at least one different polymer to an oxide semiconductor electrode and coordinative attachment of said conductive polymer and said at least one different polymer to a non-oxide semiconductor electrode.

25. A method of chemically attaching a conductive polymer with at least one different polymer to a semiconductor electrode surface comprising attaching a coupling reagent to a selected one of a monomer of said conductive polymer, a monomer of said at least one different polymer and said electrode surface, and thereafter chemically attaching said coupling reagent to a remaining unattached one of said monomer of said conductive polymer, said monomer of said at least one different polymer and said electrode surface, and thereafter copolymerizing said monomer of said conductive polymer and said monomer of said at least one different polymer to effect covalent attachment of said monomer of said conductive polymer and said monomer of said at least one different polymer to an oxide semiconductor electrode and coordinative attachment of said monomer of said conductive polymer and said monomer of said at least one different polymer to a non-oxide semiconductor electrode.

* * * * *